United States Patent
Barry et al.

(10) Patent No.: US 9,393,629 B2
(45) Date of Patent: Jul. 19, 2016

(54) CUTTER ELEMENTS, ROTARY MACHINE TOOLS COMPRISING SAME AND METHOD FOR MAKING SAME

(75) Inventors: John James Barry, County Clare (IE); Robert Fries, Springs (ZA); Maweja Kasonde, Springs (ZA)

(73) Assignee: Element Six Abrasives S.A., Luxembourg (LU)

( * ) Notice: Subject to any disclaimer, the term of this patent is extended or adjusted under 35 U.S.C. 154(b) by 408 days.

(21) Appl. No.: 13/702,036

(22) PCT Filed: Jun. 13, 2011

(86) PCT No.: PCT/EP2011/059757
§ 371 (c)(1),
(2), (4) Date: Mar. 11, 2013

(87) PCT Pub. No.: WO2011/157667
PCT Pub. Date: Dec. 22, 2011

(65) Prior Publication Data
US 2013/0209184 A1    Aug. 15, 2013

Related U.S. Application Data

(60) Provisional application No. 61/355,243, filed on Jun. 16, 2010.

(30) Foreign Application Priority Data

Jun. 16, 2010  (GB) .................................. 1010061.8

(51) Int. Cl.
  *B23C 5/10* (2006.01)
  *B23P 15/34* (2006.01)
(52) U.S. Cl.
  CPC ................. *B23C 5/10* (2013.01); *B23C 5/1009* (2013.01); *B23C 5/1081* (2013.01); *B23P 15/34* (2013.01);

(Continued)

(58) Field of Classification Search
  CPC ...... B23C 5/1009; B23C 5/1018; B23C 5/16; B23C 5/10; Y10T 408/78; Y10T 408/81; Y10T 407/1904; Y10T 407/1946; Y10T 407/1948; Y10T 407/195; Y10T 407/1952; Y10T 407/1966; Y10T 407/26; Y10T 407/27
  USPC ............. 407/32, 53, 54, 55, 56, 63, 118, 119; 408/144, 145; 76/115, 108.6
  See application file for complete search history.

(56) References Cited

U.S. PATENT DOCUMENTS 3,913,196 A    10/1975  Maday
4,227,837 A *  10/1980  Yodoshi ......................... 407/53
(Continued)

FOREIGN PATENT DOCUMENTS

EP      0365218 A1    4/1990
JP      59 27287      7/1984
(Continued)

OTHER PUBLICATIONS

Machine Translation of JP 2006-225208 Application which is equivalent to attached JP 2008-049409 Publication. Feb. 3, 2015.*

*Primary Examiner* — Daniel Howell
*Assistant Examiner* — Nicole N Ramos
(74) *Attorney, Agent, or Firm* — Armstrong Teasdale LLP (57) ABSTRACT

A cutter element (100) for a rotary machine tool having an axis of rotation, the cutter element comprising a plurality of cutting edges (110) defined by at least one cutter structure (120) comprising superhard material, consecutive cutting edges being spaced apart by at most 10 mm and configured operable to cut a body when moved in a direction that is substantially non-aligned with the axis of rotation.

8 Claims, 7 Drawing Sheets (52) U.S. Cl.
CPC ... *B23C 2210/0485* (2013.01); *B23C 2226/125* (2013.01); *B23C 2226/27* (2013.01); *B23C 2226/315* (2013.01); *B23C 2240/08* (2013.01); *Y10T 407/1904* (2015.01); *Y10T 407/1946* (2015.01); *Y10T 407/1948* (2015.01); *Y10T 407/26* (2015.01); *Y10T 407/27* (2015.01)

(56) References Cited

U.S. PATENT DOCUMENTS

| | | | |
|---|---|---|---|
| 4,572,714 A * | 2/1986 | Suzuki et al. | 408/230 |
| 4,797,241 A * | 1/1989 | Peterson et al. | 264/122 |
| 4,988,241 A * | 1/1991 | Colligan | 407/51 |
| 5,031,484 A | 7/1991 | Packer | |
| 5,065,647 A | 11/1991 | Johnson | |
| 5,115,697 A | 5/1992 | Rodriguez et al. | |
| 5,354,155 A | 10/1994 | Adams | |
| 5,580,196 A | 12/1996 | Thompson | |
| 5,653,627 A | 8/1997 | Nishi et al. | |
| 5,685,671 A * | 11/1997 | Packer et al. | 407/54 |
| 5,701,578 A | 12/1997 | Liu | |
| 5,868,885 A | 2/1999 | Crockett et al. | |
| 6,053,670 A * | 4/2000 | Schmid | 407/34 |
| 6,164,876 A * | 12/2000 | Cordovano | 407/59 |
| 7,104,160 B2 | 9/2006 | Fries et al. | |
| 2004/0093989 A1* | 5/2004 | Fries | B22F 7/06 76/108.1 |
| 2008/0240872 A1 | 10/2008 | Rimet | |
| 2010/0005728 A1* | 1/2010 | Bellin | 51/309 |

FOREIGN PATENT DOCUMENTS

| | | |
|---|---|---|
| JP | 61041703 A | 2/1986 |
| JP | S6286102 A | 4/1987 |
| JP | S6257681 B2 | 12/1987 |
| JP | 6 79544 A | 3/1994 |
| JP | 06312310 A | 11/1994 |
| JP | 7116904 A | 5/1995 |
| JP | 8141816 A | 6/1996 |
| JP | H08336716 A | 12/1996 |
| JP | H11156623 A | 6/1999 |
| JP | 2002059309 A * | 2/2002 |
| JP | 2003025134 A | 1/2003 |
| JP | 2003175406 A | 6/2003 |
| JP | 2004090148 A | 3/2004 |
| JP | 2004516152 A | 6/2004 |
| JP | 2004-268202 A | 9/2004 |
| JP | 2004322226 A | 11/2004 |
| JP | 2006102823 A * | 4/2006 |
| JP | 2007-075992 A | 3/2007 |
| JP | 2008-012610 | 1/2008 |
| JP | 2008049409 A * | 3/2008 |
| JP | 2008-110437 A1 | 5/2008 |
| JP | 2010105091 A | 5/2010 |
| WO | 02/062512 A2 | 8/2002 |
| WO | 03/086689 A1 | 10/2003 |
| WO | 2004/072435 A1 | 8/2004 |
| WO | 2006-099194 A2 | 9/2006 |

* cited by examiner

CUTTER ELEMENTS, ROTARY MACHINE TOOLS COMPRISING SAME AND METHOD FOR MAKING SAME

This disclosure relates generally to cutter elements for rotary machine tools, particularly but not exclusively to end mill, router or reamer tools; methods for making same and rotary machine tools comprising same.

BACKGROUND

Some types of rotary machine tools such as twist drills and reaming tools are configured to advance into a workpiece in a direction generally aligned with the axis of rotation of the rotary machine tool. In other words, such tools are designed to drill or bore into a body, the primary feed direction being substantially aligned with the axis of rotation. Other types of machine tools such as end mill tools and router tools are configured to advance side-on into a workpiece, the primary feed direction being substantially non-aligned with the axis of rotation (or even substantially laterally with respect to the axis of rotation). Rotary tools having a relatively small diameter may be too small to be made by clamping or brazing a sufficient number of inserts onto a tool body sufficiently precisely or robustly. A further disadvantage of brazing segments onto tools is that there may be a practical limitation on the closeness of the spacing between cutting edges on a side cutting surface. For example, it may be difficult for all but experimental tools to have superhard cutting edges spaced apart on a side cutting surface closer than about 10 mm. Consequently, there may be a practical limitation on the number of cutting edges which can be achieved on a tool, particularly a rotary tool, which may limit the productivity that may be achieved using the tool. In the case of metal cutting, tool productivity may be primarily determined by the product of the chip load per cutting edge and the number of cutting edges.

European patent number 1 351 798 discloses a method of producing a cutting tool, the method including providing an unbonded assembly comprising a cylindrical core having ends and an elongate side surface covered partially or completely by an unsintered layer of ultra-hard abrasive particles, and sintering the unbonded assembly to provide a product comprising a cylindrical core and an ultra-hard abrasive material bonded to the core. The sintered product is then worked to produce one or more cutting edges in the ultra-hard abrasive material.

While a greater number of cutting edges may improve the efficiency of a machine tool in use, the cost and complexity of providing a greater number of cutting edges is likely to be relatively high, especially in the case of relatively small rotary cutter elements.

SUMMARY

Viewed from one aspect there can be provided a tool element, more specifically a cutter element for a rotary machine tool such as a milling or routing tool having an axis of rotation (for rotation in use), the cutter element comprising a plurality of (or at least three) cutting edges defined by at least one cutter structure comprising superhard material such as PCD material or PCBN material, consecutive cutting edges being spaced apart by at most 10 mm and configured operable to cut a body when moved in a direction that is substantially non-aligned with the axis of rotation, or substantially laterally with respect to the axis of rotation. In some example arrangements, consecutive cutting edges may be spaced apart by at most about 10 mm azimuthally (circumferentially) about the axis of rotation.

Viewed from another aspect there can be provided a cutter element for a rotary machine tool, the cutter element having a proximate end, a distal end and a peripheral side connecting the proximate and distal ends; the cutter element comprising a plurality (or at least three) cutting edges provided on the peripheral side by a cutter structure comprising superhard material such as PCD material or PCBN material, consecutive cutting edges on the peripheral side being spaced apart by at most 10 mm, in the general direction of rotation as in use (azimuthally or circumferentially in some arrangements).

In some example arrangements, the consecutive cutting edges may be spaced apart by less than about 6 mm, at most about 5 mm, at most about 2 mm or at most about 1 mm apart.

Viewed from another aspect there can be provided a cutter element for a rotary machine tool comprising a superhard structure bonded to a cemented carbide substrate and defining at least three cutting edges, a plurality of bi-directional helical flutes formed into the superhard structure.

Viewed from another aspect there can be provided a rotary machine tool such as a milling or routing tool having an axis of rotation, comprising a disclosed cutter element.

Viewed from another aspect, there can be provided a method for making a cutter element for a rotary machine tool, the method including providing a precursor body comprising a superhard structure such as a PCD or PCBN structure joined to a cemented carbide substrate; the precursor body having a proximate end, a distal end and a peripheral side connecting the proximate and distal ends, the superhard structure disposed on the peripheral side; and removing portions of the superhard structure from the peripheral side to form a plurality of (or at least three) cutting edges on the peripheral side, consecutive cutting edges spaced apart from each other by at most about 10 mm, at most about 6 mm, at most about 5 mm, at most about 2 mm or at most about 1 mm. The method may include machining the cutter element to form relief and rake face angles of the cutting edge. The method may include removing portions of the superhard structure and forming a plurality of flutes.

DETAILED DESCRIPTION

Non-limiting example arrangements are described to illustrate the disclosure.

Figure 1:
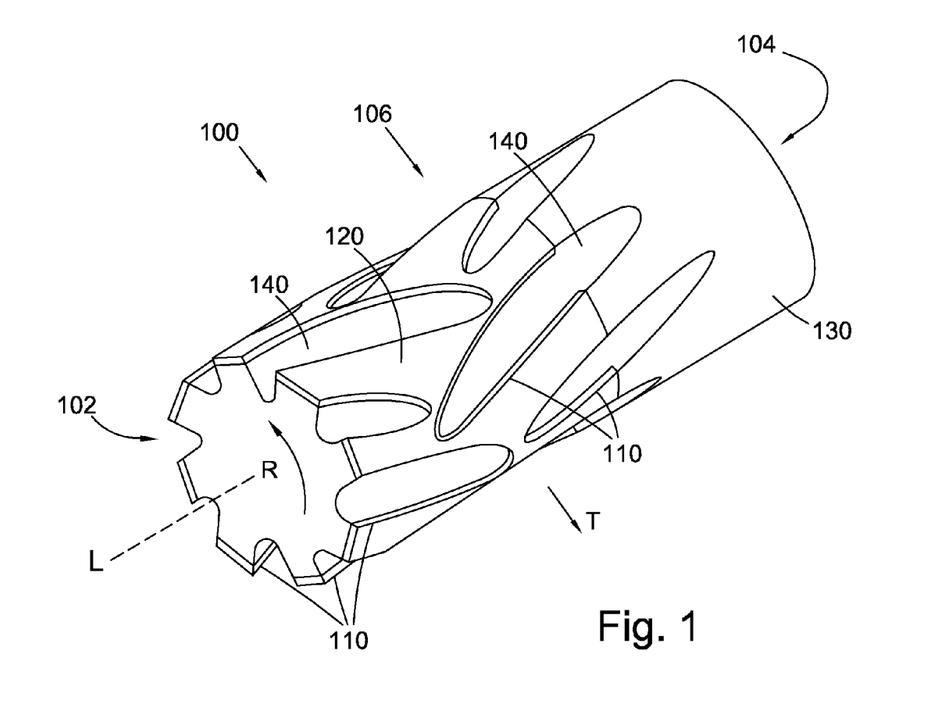
FIG. 1, FIG. 2 and FIG. 3 show a schematic perspective views of example bi-directionally fluted rotary machine tools.

With reference to FIG. 1, an example cutter element 100 for a rotary machine tool (not shown) comprises a plurality (at least 16 in this particular arrangement) spaced apart cutting edges 110 provided (defined) by a superhard cutter structure 120 comprising PCD material or PCBN material. For example, the rotary machine tool may be for edge trimming a sheet of carbon fibre-reinforced material. The cutter element 100 has a proximate end 102, a distal end 104 and a peripheral side 106 connecting the proximate end 102 and the distal end 104. Consecutive cutting edges 110 on the peripheral side 106 are at most about 5 mm apart. In other words, consecutive edges 110 are at most about 5 mm apart azimuthally in this example arrangement, in which the cutter element 100 has a generally cylindrical shape. The superhard cutter structure 120 may have a generally tubular form and may be integrally bonded adjacent the proximate end 102 of a generally cylindrical cobalt-cemented tungsten carbide substrate 130. The distal end 104 of the cutter element 100 may be brazed or otherwise joined to the tool body. Bi-directional flutes 140 are formed into the cutter structure 120, exposing cemented carbide material of the substrate 130.

In use, for example in trimming the edge of a fibre-reinforced plate or sheet (not shown), the cutter element 100 rotates about longitudinal axis L in the direction R and may be translated substantially laterally with respect to the axis L, in the general direction T against the edge of a workpiece to trim the edge of the workpiece. Consecutive cutting edges 110 on the peripheral side 106 are spaced apart by at most about 5 mm in the general direction of rotation R as in use. A bi-directional configuration of the flute 140 may reduce delamination of the plate or sheet by having the effect of compressing both the upper and lower faces of the plate or sheet as it performs a cutting action.

Figure 2:
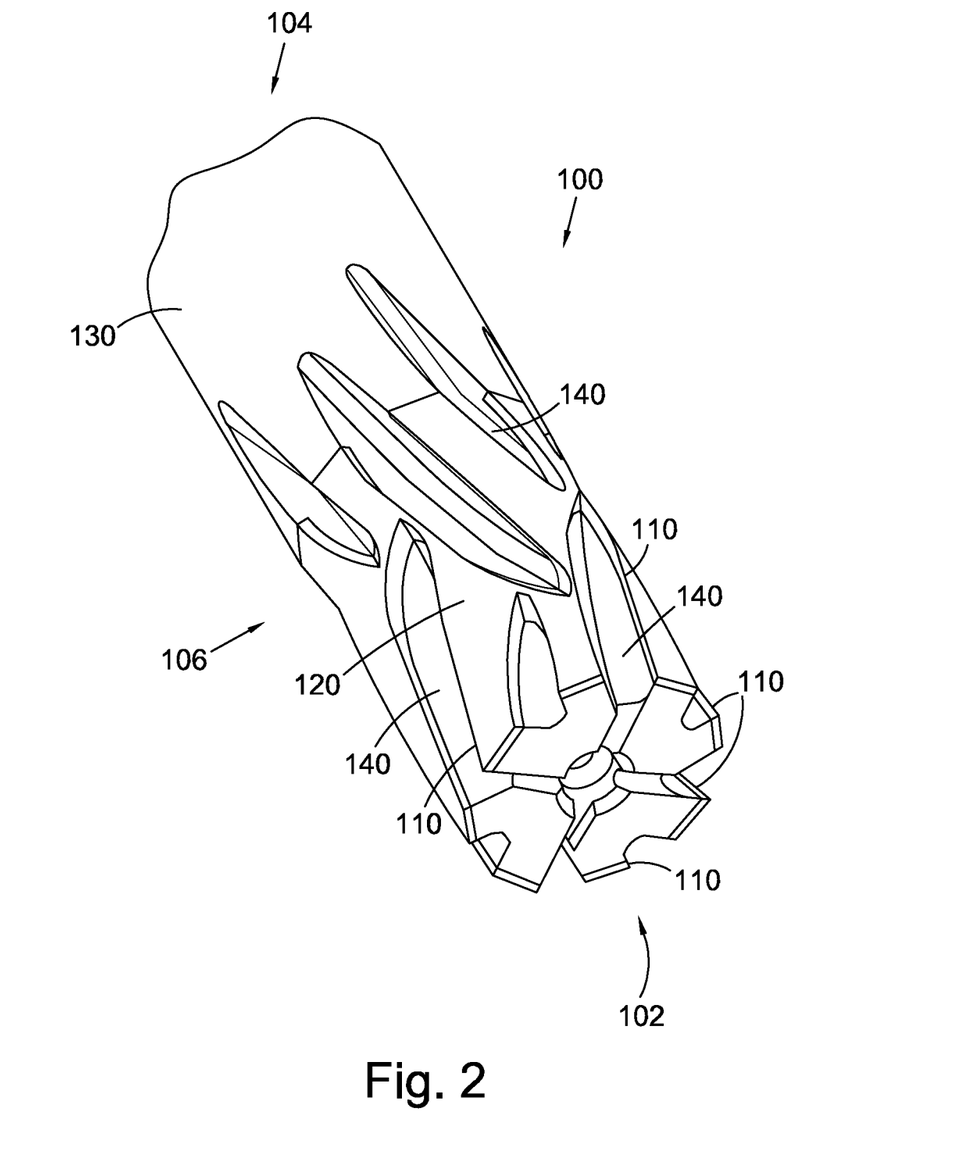

With reference to FIG. 2, another example arrangement of a cutter element 100 for a rotary machine tool comprises spaced apart cutting edges 110 formed by a superhard cutter structure 120 comprising PCD material or PCBN material, in which consecutive cutting edges 110 on the peripheral side 106 are at most about 5 mm apart. Bi-directional flutes 140 are formed into the cutter structure 120, exposing cemented carbide material of the substrate 130.

Figure 3:
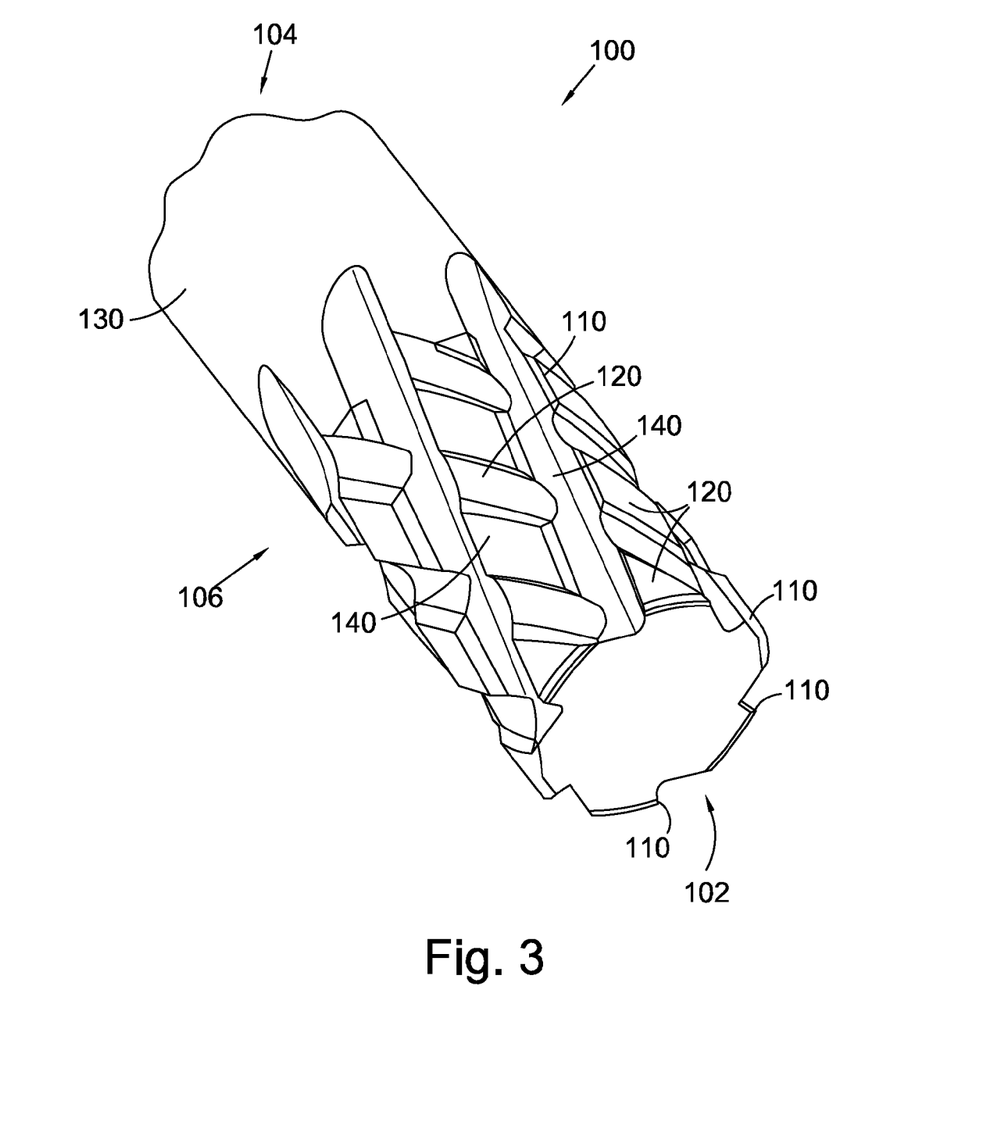

With reference to FIG. 3, another example arrangement of a cutter element 100 for a rotary machine tool comprises spaced apart cutting edges 110 formed by a plurality of superhard cutter structures 120 comprising PCD material or PCBN material, in which consecutive cutting edges 110 on the peripheral side 106 are at most about 5 mm apart. Bi-directional flutes 140 are formed into the cutter structure 120, exposing cemented carbide material of the substrate 130.

Figure 4:
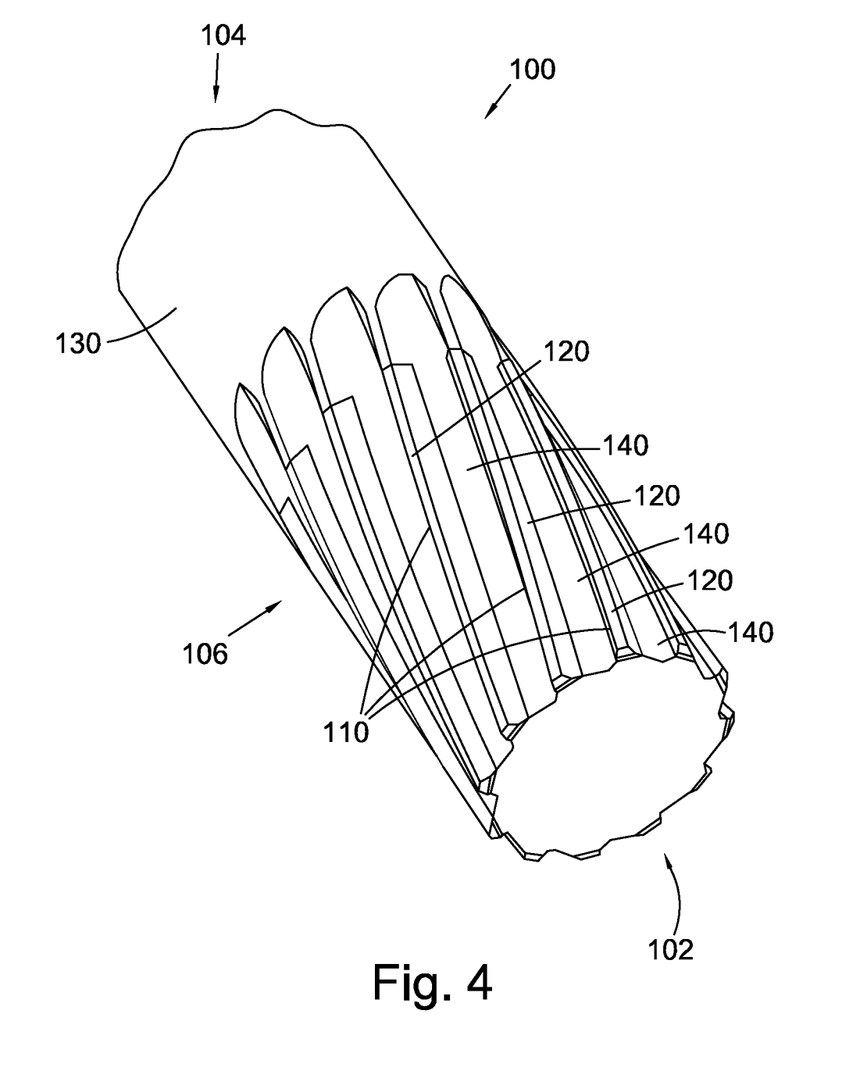
FIG. 4 shows a schematic perspective view of an example fluted rotary machine tool.

With reference to FIG. 4, an example arrangement of a cutter element 100 for a rotary machine tool comprises spaced apart cutting edges 110 formed by a plurality of superhard cutter structures 120 comprising PCD material or PCBN material, in which consecutive cutting edges 110 on the peripheral side 106 are at most about 5 mm apart. Single directional flutes 140 are formed into the cutter structure 120, exposing cemented carbide material of the substrate 130.

Figure 5:
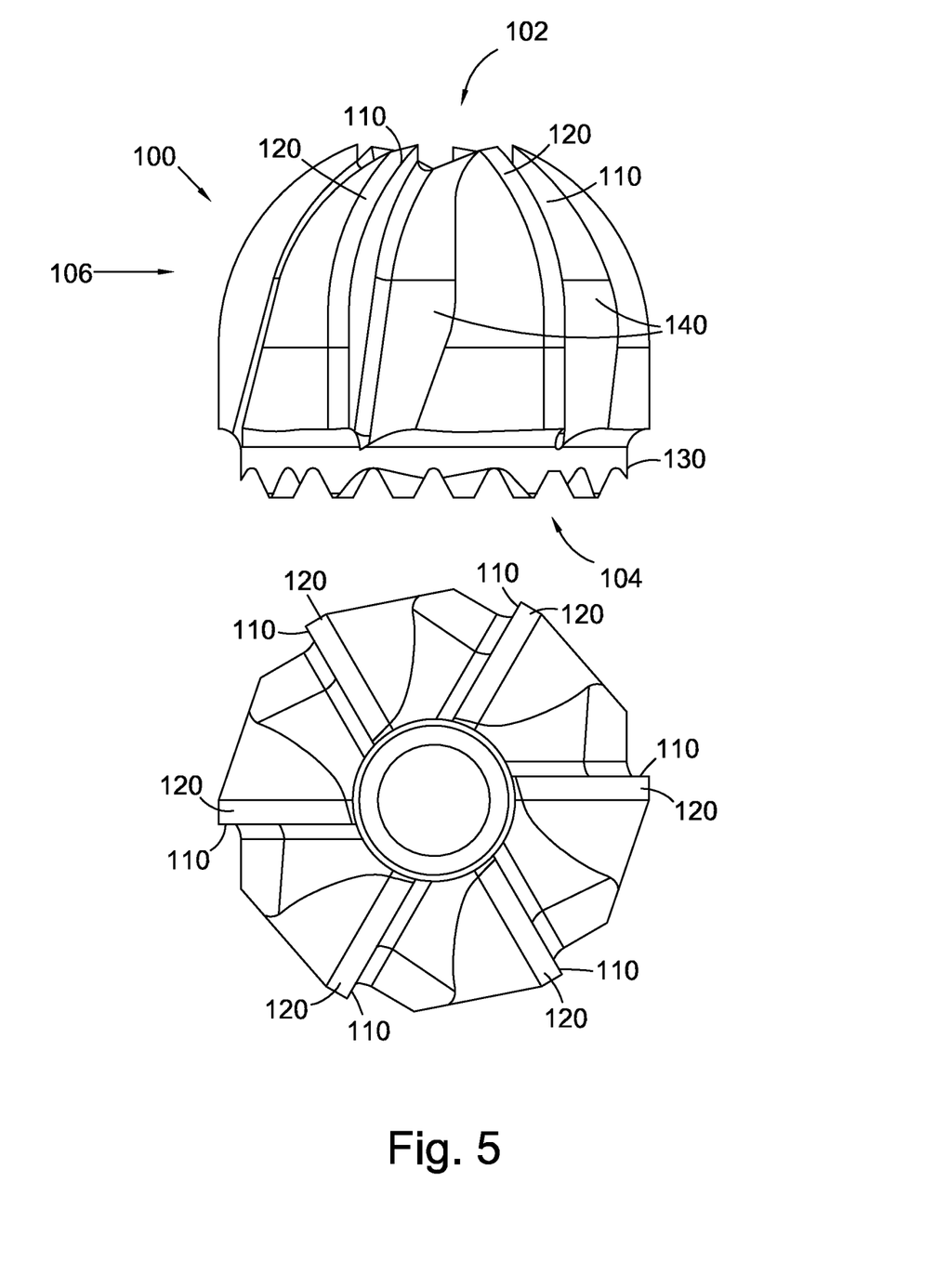
FIG. 5 shows a schematic side and plan view (i.e. from the proximate end) of an example of a ball-nosed end mill.

With reference to FIG. 5, an example cutter element 100 for a ball-nosed end mill, which is a type of rotary machine tool (not shown), comprises spaced apart cutting edges 110 formed by PCD or PCBN cutter structures 120, consecutive cutting edges 110 on the peripheral side (i.e. when viewed from the side) being at most about 5 mm apart. The cutter structures 120 may have a generally convex or domed form and may be integrally bonded adjacent a proximate end 102 of a generally cylindrical cobalt-cemented tungsten carbide substrate 130. A distal end 104 of the substrate may be brazed or otherwise joined to tool body (not shown). Single-directional flutes 140 are formed into the cutter structures 120, exposing cemented carbide material of the substrate 130.

Figure 7:
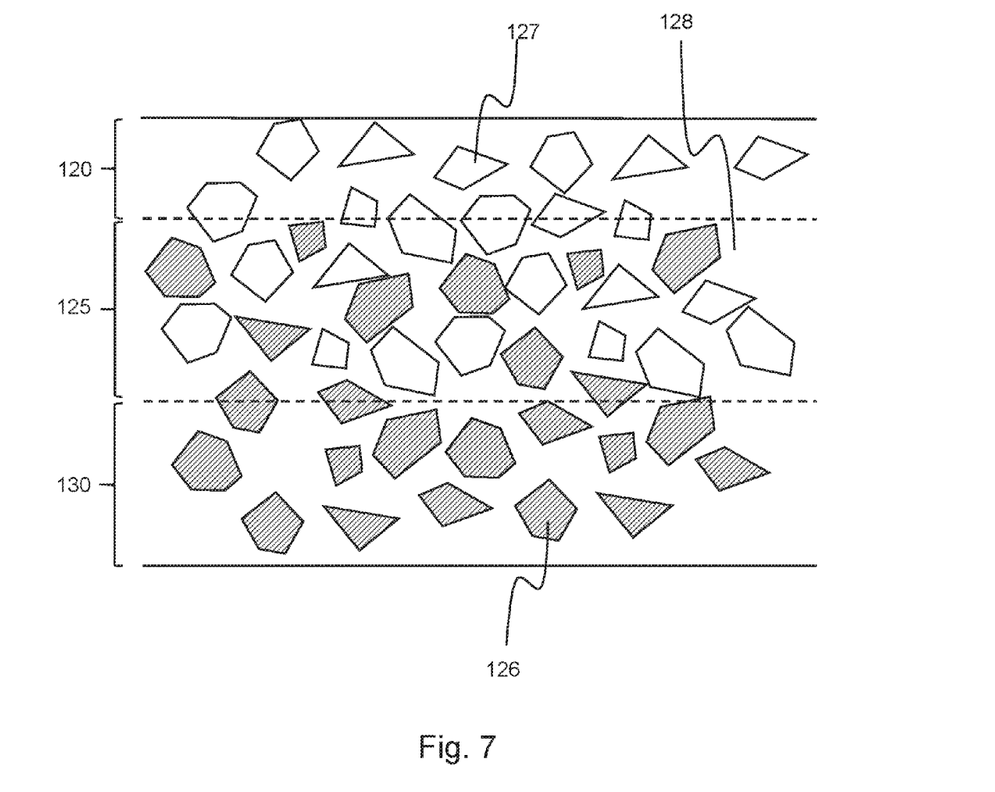
FIG. 7 shows schematically a side view of an interlayer between a superhard material and a substrate.

In example arrangements, and as shown in FIG. 7, a cutter element 100 may comprise a superhard cutter structure 120 joined to a cemented carbide substrate 130 by means of at least one intermediate layer 125 between the superhard cutter structure 120 and the substrate 130, the intermediate layer 125 comprising grains of metal carbide 126 and grains of superhard material 127 dispersed in a matrix material 128. For example, a cutter element 100 may comprise at least three intermediate layers. Each intermediate layer may be at least about 0.1 mm or at least about 0.2 mm thick. At least one intermediate layer may comprise grains of diamond and grains of tungsten carbide dispersed in a matrix comprising cobalt, the combined content of the carbide and diamond grains being at least about 20 volume percent of the intermediate layer. Such arrangements may have the aspect of exhibiting enhanced resistance to fracture.

One example method for making a cutter element includes providing a precursor body comprising a superhard structure joined to a substrate comprising cemented carbide material, and removing portions of the superhard structure to expose substrate material and to provide lateral cutting edges. The precursor body may have a proximate end and a peripheral surface depending from the proximate end, and may be manufactured by sintering together an aggregated plurality of diamond grains onto a peripheral surface of a cobalt cemented carbide substrate at an ultra-high pressure and high temperature.

In one example arrangement, the precursor body may have a generally rounded or dome-shaped proximate end, and may be suitable for making a ball-nose tool for milling complex cavities. Such tools may have a lateral cross section diameter in the range from about 10 mm to about 25 mm.

An example method for making a cutter element for a rotary machine tool may include providing a precursor body comprising a superhard structure joined to a cemented carbide substrate. The precursor body may have a proximate end, a distal end and a peripheral side connecting the proximate and distal ends, and may be configured with the superhard structure disposed substantially on the peripheral side. The superhard structure may be joined to the cemented carbide substrate by means of three intermediate layers between the superhard structure and the substrate. The intermediate layers may comprise grains of tungsten carbide and grains of a superhard material dispersed in a matrix comprising cobalt. The content of the cobalt in intermediate layer is less than that in layer, which is less than that in layer. Each intermediate layer is at least about 0.2 mm thick and at most about 0.3 mm thick. The cemented carbide substrate may have an elongate or generally cylindrical form having a proximate end and a distal end, and a side surface connecting the proximate and distal ends. The proximate end may have a substantially rounded conical shape, or it may be substantially flat or planar. The superhard structure may be joined to the substrate near or adjacent the proximate end. Portions of the superhard structure are removed to expose substrate material underlying the removed portion and providing spaced apart cutting edges on the peripheral side and defined by a superhard cutter structure, consecutive cutting edges on the peripheral side of the precursor body being at most about 10 mm apart from each other.

In example methods, the precursor body may have a generally convex, rounded or dome-shaped end and comprise a PCD or PCBN structure joined to a cemented carbide substrate, as may be used on a percussion or roller cone bit for boring into the earth. A plurality of cutting edges may be formed into the PCD or PCBN structure by machining methods (such as electro-discharge machining, laser cutting or grinding) to form an embodiment of a ball-nosed cutter element as described. The number of cutting edges may be selected depending on the application. In one embodiment, the edges may be configured generally helically to provide a helical 'sweep' for improved control of chips. For example, a ball-nosed cutter element may comprise cutting edges formed into a PCBN structure.

Figure 6:
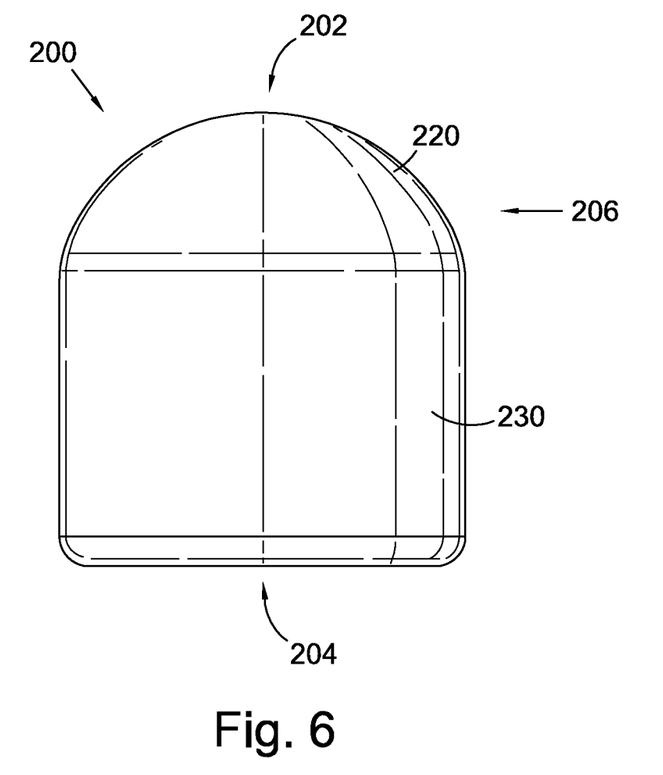
FIG. 6 shows a schematic side view of an example precursor body.

With reference to FIG. 6, an example arrangement of a precursor body 200 for making a ball-nose end mill has a generally dome-shaped proximate end 202, a distal end 204 and a peripheral side 206 connecting the proximate end and the distal end. The precursor body 200 comprises a generally domed PCD structure 120 joined to a cemented carbide substrate 230. An example method may include removing PCD material from the PCD structure 120 to form cutting edges and flutes.

Example machine tools comprising a disclosed cutter element may be for milling or routing a workpiece, particularly a workpiece comprising a hard or abrasive material such as metal, ceramic material, composite material, wood, stone, concrete or masonry. For example, the machine tool may be a compression router for edge-trimming bodies comprising fibre-reinforced plastic materials, or a helical multi-flute router or a burr for edge-finishing bodies comprising composites materials. The cutter element may be for a routing tool, or a tool for milling or trimming edges of a body, particularly a body comprising material reinforced with carbon fibre. In another example, the cutter element is for a ball-nose tool.

In one version of an example method, a precursor body may made using steps of preparing a pre-sinter assembly comprising a plurality of diamond-containing foils stacked onto a proximate end of a cemented tungsten carbide substrate, and subjecting the pre-sinter assembly to an ultra-high pressure and high temperature to sinter the diamond and form a PCD structure joined to a cemented carbide substrate via at least one intermediate layer containing diamond grains and carbide grains. The foils may be cut from sheets comprising diamond grains held together by an organic binder and the sheets for intermediate layers may comprise diamond grains and tungsten carbide grains held together by an organic binder. The sheets may be made by a method known in the art, such as extrusion or tape casting methods, wherein slurry comprising diamond grains and a binder material is laid onto a surface and allowed to dry. Other methods for making diamond-bearing sheets may also be used, such as described in U.S. Pat. Nos. 5,766,394 and 6,446,740. Alternative methods for depositing diamond-bearing layers include spraying methods, such as thermal spraying. The pre-sinter assembly may be encapsulated into a capsule for an ultra-high pressure furnace, as is known in the art, and subjected to a pressure of at least about 5 GPa and a temperature of at least about 1,300 degrees centigrade, and the diamond grains sintered together to form PCD. Cobalt for promoting the sintering of the diamond and for cementing the grains of the intermediate layer or layers may be sourced from the cemented carbide substrate.

One version of an example method may include providing a cemented carbide substrate having a shaped, elongate proximate end portion defining a support surface; providing a superhard structure having a join surface configured to have a shape complementary to that of the support surface; joining the join surface of the superhard structure to the support surface of the substrate; and removing portions of the superhard structure to expose substrate material underlying the removed portion and providing the relief and rake face angles which define the cutting edge.

In one version of the method, the cemented carbide substrate may have an elongate or generally cylindrical form. The substrate may have a proximate and a distal end, the distal end being an attachment end, and a side surface connecting the proximate and distal ends; at east part of the proximate end having a substantially conical, frusto-conical shape or rounded conical shape, for example a spherically rounded conical shape; the superhard structure being disposed adjacent the proximate end.

In one version of the method, the precursor body is a superhard insert comprising PCD material for use in a drill bit for boring into the earth.

A method of using an example cutter element may include providing a routing or edge tripping tool comprising the cutter element, and trimming the edge of a plate comprising a fibre-reinforced material.

Certain arrangements of rotary machine tools may have the aspect of enabling enhanced productivity, and certain arrangements may have the aspect that they exhibit more complex and sophisticated configuration of cutting edges, and or that they provide the tool designer with more flexibility in design of cutting edges so as to better meet the demands of the machining application. Certain disclosed example methods of making cutter elements may have the aspect of being easier or less costly to implement.

Further non-limiting examples of cutter elements are described in more detail below.

EXAMPLE 1

A tip for a router tool may be made by forming a plurality of helical flutes and associated cutting edges into a PCD layer formed onto an end portion of a generally cylindrical, elongate substrate comprising cemented carbide. The carbide substrate may have an end diameter of about 10 mm and a length of about 15 mm, and comprise about 13 weight percent cobalt binder material. A cylindrical recess for accommodating a precursor structure for a PCD layer may be formed adjacent a proximate end of the substrate and extending a distance from the proximate end towards a distal end. The depth of the recess may be about 3 mm.

A precursor structure for a PCD layer may be made by preparing a sheet comprising diamond grains held together by a water-based organic binder. The sheet may be about 500 microns in thickness and comprise diamond grains having a mean size in the range from about 5 microns to about 15 microns, and may be made by means of tape casting. This would involve preparing slurry comprising diamond grains and an organic binder being cast onto a belt and dried to remove the binder solvent. The content of the diamond grains in the sheet should be at least about 50 volume percent of the sheet. About six strips may be cut from the sheet, the strips each having a slightly different length such that they may be stacked upon one another sequentially, starting with the shortest strip and ending with the longest strip, and wrapped around the recess portion of the substrate adjacent the proximate end with the shortest strip in contact with the substrate. The respective lengths of the strips should be just sufficient for the ends of each strip to touch each other when wrapped around the substrate, depending on the respective position of the strip in the stack. The width of the strips should be substantially the same as each other and equal to the width of the recess portion.

A pre-sinter assembly may thus be formed, comprising a substantially co-axial tubular arrangement of a plurality of wrapped strips containing diamond grains. The pre-sinter assembly may be encapsulated into a capsule for an ultra-high pressure furnace, as would be appreciated by the skilled person, and subjected to a pressure of at least about 5 GPa and a temperature of at least about 1,300 degrees centigrade, at which diamond grains in the presence of cobalt may sinter together. The cobalt may be sourced from the substrate during the ultra-high pressure, high temperature treatment. The resulting component would comprise a tube of sintered PCD material integrally bonded co-axially at the end of a carbide substrate cylinder.

The sintered component may then be processed to form a cutter element for a router tool. Eight helical flutes may be formed into the PCD tube by means of electro-discharge machining, the depth of the flutes being sufficient to expose carbide material from the underlying substrate. Eight cutting edges may be formed adjacent respective flutes, the mean circumferential distance between consecutive cutting edges being about 4 mm. The cutter element may be finished to final shape and dimensional tolerances by means of a combination of electro-discharge machining and mechanical diamond grinding.

EXAMPLE 2

A cutter element for a rotary machine tool, comprising a PCD structure may be produced as described in this Example. A pre-sinter assembly may be prepared by providing a housing having an internal shape at one end configured with the same general shape as the intended shape of the working surface of the PCD structure, and assembling precursor layers for the PCD structure and intermediate layers, as well as a substrate body into the housing.

The cemented carbide substrate may be formed of cobalt-cemented cemented tungsten carbide, comprising about 13 weight % cobalt, and WC grains having a mean size in the range from about 4 microns to about 6 microns. The proximate end of the substrate may have a dome shape and the maximum lateral diameter of the substrate may be about 10 mm.

Three precursor layers for the three respective intermediate layers, designated L1, L2 and L3, may each be formed from a respective sheet, designated S1, S2 and S3, comprising three different compositions of diamond and tungsten carbide grains. One of the sheets, designated S1, may also comprise admixed cobalt in powder form. The compositions of the sheets in weight percent are shown in table 1 below, excluding the organic binder. The sheets may be formed by means of tape casting respective slurries comprising the diamond and tungsten carbide grains and an organic binder, and allowing the cast slurries to dry. The diamond grains may have a multi-modal size distribution and a mean size in the range from about 5 microns to about 15 microns. Blank foils F1, F2 and F3 may be cut from respective sheets S1, S2 and S3 to dimensions suitable for assembling into the housing, and forming each foil to comply with the internal shape of the end of the housing.

TABLE 1

|    | Diamond  | WC       | Co      |
|----|----------|----------|---------|
| S1 | 75 wt. % | 25 wt. % | 0 wt. % |
| S2 | 50 wt. % | 50 wt. % | 0 wt. % |
| S3 | 20 wt. % | 61 wt. % | 19 wt. %|

The pre-compact assembly may be assembled by placing a precursor layer for the PCD structure into the housing in contact with the shaped internal end of the housing, placing foil F1 against the PCD precursor layer, placing foil F2 against F1, placing a foil F3 against F2, and then placing the substrate body into the housing, pressing its proximate end against F3.

The pre-compact assembly may then be subjected to heat treatment in a vacuum to burn off substantially all of the organic binder and then assembled into a capsule for an ultra-high pressure furnace. The pre-compact assembly may be subjected to a pressure of about 5.5 GPa and a temperature of about 1,350 degrees centigrade to sinter the PCD precursor structure to form a PCD end cap joined to the substrate body via three intermediate layers.

The sintered component may then be processed to form a cutter element for a ball-nose end-milling tool. Eight helical flutes may be formed into the PCD hemi-spherical surface by means of electro-discharge machining, the depth of the flutes being sufficient to expose carbide material from the underlying substrate. Eight cutting edges may be formed adjacent respective flutes, the mean circumferential distance between consecutive cutting edges being at most, about 4 mm. The cutter element may be finished to final shape and dimensional tolerances by means of a combination of electro-discharge machining and mechanical diamond grinding.

Certain terms and concepts as used herein are explained.

A machine tool is a powered mechanical device, which may be used to manufacture components comprising materials such as metal, composite materials, wood or polymers by machining. Machining is the selective removal of material from a body or a workpiece. A rotary machine tool is a machine tool comprising a cutter element, for example a drill bit, which rotates about its own axis in use. A rake face of a cutter element is the surface or surfaces over which the chips flow when the tool is used to remove material from a body, the rake face directing the flow of newly formed chips. Chips are the pieces of a body removed from the work surface of the body by a machine tool in use. A flank of a cutter element is the surface or surfaces of the machine tool that passes over the machined surface produced on the body by a machine tool. The flank may provide a clearance from the body and may comprise more than one flank face. A cutting edge is the edge of a rake face intended to perform cutting of a body and a flute is a recessed portion of a rotary machine tool that is capable of conveying chips away from a cutting edge as the tool rotates in use. Example rotary machine tools such as taps, ball-nose end mills and straight end mills (which may sometimes be referred to as slot-drills) may have up to six or more cutting edges and flutes. A helical flute (also called a spiral flute) comprises a flute arranged generally and at least partially helically with respect to a rotational axis of a rotary machine tool, and a bi-directional helical flute configuration comprises flutes having different or opposite helical directions.

As used herein, a superhard material has a Vickers hardness of at least about 28 GPa. Diamond and cubic boron nitride (cBN) material are examples of superhard materials. Polycrystalline diamond (PCD) material comprises a mass (an aggregation of a plurality) of diamond grains, a substantial portion of which are directly inter-bonded with each other and in which the content of diamond is at least about 80 volume percent of the material. Interstices between the diamond grains may be at least partly filled with a binder material comprising catalyst material for synthetic diamond, or they may be substantially empty. A catalyst material for synthetic diamond is capable of promoting the growth of synthetic diamond grains and or the direct inter-growth of synthetic or natural diamond grains at a temperature and pressure at which synthetic or natural diamond is thermodynamically stable. Examples of catalyst materials for diamond are Fe, Ni, Co and Mn, and certain alloys including these. Superhard structures comprising PCD material may comprise at least a region from which catalyst material has been removed from the interstices, leaving interstitial voids between the diamond grains.

PCD structures having at least a significant region from which catalyst material for diamond has been depleted, or in which catalyst material is in a form that is relatively less active as a catalyst, may be described as thermally stable PCD.

PCBN material comprises grains of cubic boron nitride (cBN) dispersed within a matrix comprising metal or ceramic material. For example, PCBN material may comprise at least about 60 volume percent cBN grains dispersed in a binder matrix material comprising a Ti-containing compound, such as titanium carbonitride and/or an Al-containing compound, such as aluminium nitride, and/or compounds containing metal such as Co and/or W. Some versions (or "grades") of PCBN material may comprise at least about 80 volume percent or even at least about 85 volume percent cBN grains.

More generally, a polycrystalline superhard (PCS) material comprises a mass of grains of a superhard material and interstices between the superhard grains, which may be at least partly filled with filler or binder material, the content of the superhard grains being at least about percent of the material by volume. The grains may comprise diamond or cubic boron nitride (cBN).

The invention claimed is:

1. A cutter element for a rotary machine tool having an axis of rotation in use, the cutter element comprising at least three cutting edges configured operable to cut a body when moved in a direction that is substantially non-aligned with the axis of rotation, and defined by at least one cutter structure comprising electro-discharge machine cuttable polycrystalline boron nitride (PCBN) material, the PCBN material comprising at least 80 volume per cent cubic boron nitride grains dispersed in a binder matrix comprising compounds containing cobalt and tungsten, wherein the tool has a lateral cross-section diameter of 10 to 25 mm, and wherein consecutive cutting edges are spaced apart by at most 5 mm azimuthally about the axis of rotation, and wherein the cutter structure is joined to a cemented carbide substrate by an intermediate layer between the cutter structure and the substrate, the intermediate layer comprising grains of metal carbide and grains of cubic boron nitride dispersed in a matrix material.

2. A cutter element as claimed in claim 1, comprising bi-directional flutes formed into the cutter structure.

3. A cutter element as claimed in claim 1, for a ball-nosed end mill, in which the cutter structure has a generally domed form.

4. A cutter element as claimed in claim 1, for an end mill, a routing tool or an edge-trimming tool.

5. A method for making a cutter element as claimed in claim 1, the method including providing a cylindrical precursor body comprising a tubular superhard structure joined to and surrounding a cemented carbide substrate core; the precursor body having a proximate end, a distal end and a peripheral side connecting the proximate and distal ends, the superhard structure disposed on the peripheral side; and removing portions of the superhard structure from the peripheral side to form a plurality cutting edges on the peripheral side, consecutive cutting edges spaced apart from each other by at most about 10 mm.

6. A method as claimed in claim 5, including machining the cutter element to form relief and rake face angles of the cutting edge.

7. A method as claimed in claim 5, including removing portions of the superhard structure and forming a plurality of flutes.

8. A rotary machine tool for milling, reaming or routing; comprising a cutter element as claimed in claim 1.

* * * * *